United States Patent [19]

Lonergan et al.

[11] Patent Number: 5,658,488
[45] Date of Patent: Aug. 19, 1997

[54] REGENERATION OF BHP IN A PLANT PROCESS

[75] Inventors: Thomas J. Lonergan, New Orleans, La.; John C. Horrocks, Albuquerque, N. Mex.

[73] Assignee: The United States of America as represented by the Secretary of the Air Force, Washington, D.C.

[21] Appl. No.: 419,773

[22] Filed: Apr. 11, 1995

[51] Int. Cl.$^6$ ............................ C01B 15/03; C01B 15/01; H01S 3/20; H01S 3/22
[52] U.S. Cl. .................................. 252/186.43; 252/186.1; 423/579; 423/584; 423/586; 372/51; 372/55; 372/59; 372/60
[58] Field of Search ............................ 252/186.1, 186.43; 423/579, 584, 586, 89; 372/51, 55, 59, 60

[56] References Cited

U.S. PATENT DOCUMENTS

| | | | |
|---|---|---|---|
| 4,246,252 | 1/1981 | McDermott et al. | 423/579 |
| 5,229,100 | 7/1993 | Harpole | 423/579 |
| 5,378,449 | 1/1995 | Dinges | 423/579 |
| 5,417,928 | 5/1995 | McDermott | 422/120 |
| 5,516,502 | 5/1996 | Dickerson | 423/579 |

Primary Examiner—Joseph D. Anthony
Attorney, Agent, or Firm—Thomas C. Stover

[57] ABSTRACT

Provided is method and apparatus for regenerating basic hydrogen peroxide (BHP) solution. Such solution is run through filters which are alternated for continuous filtration thereof, while the non-used filter is being cleaned. The filtered BHP solution is then reacted with $H_2O_2$ and $KO_2$ or KOH in a cooled reactor and again filtered and fed to a cooled storage tank as replenished BHP solution. The replenished BHP solution can then be fed to a singlet oxygen generator (SOG) for reaction with $Cl_2$ to emit singlet delta oxygen (to fuel a COIL laser system) and depleted BHP solution, which is then recycled for filtration and regeneration as before. Thus the process of the invention provides for continuous regeneration of BHP solution for extended use in a COIL. That is, extended COIL run times are required by a COIL for welding and/or cutting operations. At the same time the process of the invention minimizes the amount of BHP required to run the COIL since the BHP is regenerated and recycled. Further, smaller BHP run/mix/storage tanks can be used.

6 Claims, 2 Drawing Sheets

REGENERATION OF BHP IN A PLANT PROCESS

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a method of regenerating basic hydrogen peroxide (BHP) that has been depleted in a chemical system, particularly regenerating BHP in a plant scale operation.

2. The Prior Art

Basic hydrogen peroxide (BHP) is the principle fuel for Chemical Oxygen-Iodine Lasers (COIL). COIL systems have market potential for both military and industrial applications in that such systems output a powerful laser beam of high quality useful, e.g. in cutting and welding metals.

Such COIL systems as noted above, require BHP as a principle energy source. In the prior art BHP has been generated by reacting aqueous potassium hydroxide with aqueous hydrogen peroxide in an agitated, cooled vessel. The reactive species in BHP that results from this acid/base reaction is the hydroperoxide ion, $O_2H^-$, the conjugate base of hydrogen peroxide:

$$KOH(aq) + H_2O_2(aq) \rightarrow K^+(aq) + O_2H^-(aq) + H_2O \quad (1)$$

This solution is then passed through another reactor to form singlet delta oxygen $O_2(^1\Delta)$ from chlorine gas. Hydroperoxide ions are consumed in this singlet oxygen generator (SOG) according to the following reaction:

$$Cl_2 + 2O_2H^-(aq) + 2K^+(aq) \rightarrow O_2(^1\Delta) + H_2O_2(aq) + 2KCl(s) \quad (2)$$

BHP is generally not regenerated during laser operations, but is, instead, run batchwise until the hydroperoxide concentration is too low or the potassium chloride (KCl) concentration is too high to support lasing. The spent BHP is then discarded. At this point, only 50 mole percent of the reactive species, $O_2H^-$, has been consumed which corresponds to approximately 8 percent of the total fuel weight.

Under normal operating conditions, the run time of the laser is extended by producing the largest amount of BHP possible and flowing it through the SOG. These large Volumes of BHP simply extend the run time of COILs and do not address the problem of regenerating the fuel. As a result, large quantitites of the reactive hydroperoxide ion are wasted when the solution is finally discarded.

What is needed is a process for regenerating depleted BHP solution to avoid the above waste thereof, as well as excessively large BHP storage systems that would otherwise be required.

Also in the prior art, such regeneration of depleted BHP solution has been accomplished in the laboratory, see U.S. Pat. No. 5,378,449 to Dinges et al. (1995), which patent is incorporated herein by reference.

Such reference discloses a method for regenerating BHP by reacting $KO_2$ with an acid selected from the group consisting of $H_2O_2$ and a protic acid. Thus such reaction can be carried out according to:

$$2KO_2(s) + H_2O_2(aq) \rightarrow 2O_2H^-(aq) + O_2 + 2K^+(aq) \quad (3)$$

Thus reaction (3) regenerates BHP for use in reaction (2) above so as to evolve the singlet delta oxygen of reaction (2) used in COIL lasing. Such reactions are preferably conducted at 0° to −10° C. and the BHP product is desirably stored at about −20° C. for stability purposes.

Now when the BHP reaction (2) is depleted, $KO_2$ can be added to the BHP/$H_2O_2$ solution to react with the $H_2O_2$ of reaction (2) to regenerate BHP per reaction (3) hereof.

The $KO_2$ solid is reacted with dilute $H_2O_2$ (e.g. 10 to 30 wt. % and preferably 15 to 20 wt. % $H_2O_2$ in $H_2O$) in the (depleted) BHP solution per reactions (2) and (3) as discussed above. The $KO_2$ thus consumes one equivalent of hydrogen peroxide and produces 2 equivalents of hydroperoxide ion (BHP), thus reversing the chlorine/BHP reaction (2) that evolves singlet delta oxygen, the energetic species in the COIL system. That is, as indicated above, reaction (3) reverses the chemical process of the chlorine/BHP reaction (2) above, with respect to the $O_2H^-$(BHP) and $H_2O_2$ components. The liberation of oxygen in reaction (3) above, impedes reversibility, and encourages the completeness of the reaction. Hence, the $KO_2/H_2O_2$ reaction can be used to regenerate BHP that has been depleted through normal COIL operation. For a complete regeneration process, however, the Potassium Chloride salt, KCl must be physically removed from the BHP solution and make-up $H_2O_2$ can be added per the invention. Accordingly, the above process is a prior art process requiring periodic removal of KCl and periodic addition of $KO_2$ (or KOH) along with aqueous $H_2O_2$. The above steps are necessary in the above BHP regeneration process and have been impediments to converting the above laboratory process to a continuous BHP regeneration process for use on a commercial or plant size scale.

Thus, it is believed that the above laboratory scale process has not previously been converted to a process that could continuously regenerate depleted BHP on a commercial scale from, e.g. the process of reaction (2) above.

That is, the above prior art laboratory processes are batch-type processes in which KCl is filtered out of the depleted BHP solution and then $KO_2$ solids (or KOH pellets) and aqueous $H_2O_2$ are added to the filtered batch of depleted BHP solution to regenerate BHP solution, as described above. Again such steps constitute a batch process and a continuous BHP regeneration process suitable for commercial use, has not yet been seen in the prior art.

Accordingly, there is need and market for an improved BHP regeneration process that Significantly overcomes the above pior art shortcomings.

There has now been discovered a method for continuous regeneration of BHP suitable for use in a commercial or plant-size scale.

SUMMARY OF THE INVENTION

Broadly the present invention provides a method for the continuous regeneration of BHP from depleted BHP solution comprising a) passing the depleted BHP solution through a first filter assembly to remove solids including KCl, b) cooling the so filtered solution, c) mixing the so cooled solution with an aqueous solution of $H_2O_2$ and a component selected from the group consisting of $KO_2$ and KOH and permitting same to react to regenerate said BHP in the resulting mixture, d) passing the so reacted mixture through a second filter assembly to remove solids including KCl therefrom and e) cooling the so filtered, regenerated BHP solution for storage or reactant use as needed.

In a preferred embodiment of the above method of the invention, the BHP solution is flowed through one of an alternating pair of first filters and subsequently flowed through one of an alternating pair of second filters so that the non-used filter of each pair can be cleaned periodically without interruption of the continuous flow of the BHP solution.

Also in the preferred method of the invention, the above BHP reactants can be flowed continuously or intermittently into the reactor 34 and are drawn off continuously or intermittently through pipe 36 and after passing through the second filter 42 accumulate in cooling tank 50 to be drawn off continuously therefrom, through pipe 52 as needed.

By basic hydrogen peroxide or "BHP" or by "replenished BHP", as used herein, is meant an aqueous solution having a molarity of 4 to 8 to hydroperoxide ions ($O_2H^-$) with or without excess $H_2O_2$ as desired per the invention. When 50 mole % of the reactive species, $O_2H^-$ has been consumed (which corresponds to about 8% of the total fuel weight) then such BHP solution is depleted and cannot generate enough singlet delta oxygen (when reacted with $Cl_2$) to support COIL lasing.

By "depleted BHP" is meant about 1–4 moles of $O_2H^-$ in aqueous solution.

The condition of the BHP can be tested, e.g. by a pH meter which will indicate the concentration of the BHP in solution from depleted to replenished or points in-between.

BRIEF DESCRIPTION OF THE DRAWINGS

The invention will become more apparent from the following detailed specification and drawings in which.

DESCRIPTION OF PREFERRED EMBODIMENTS

Figure 1:
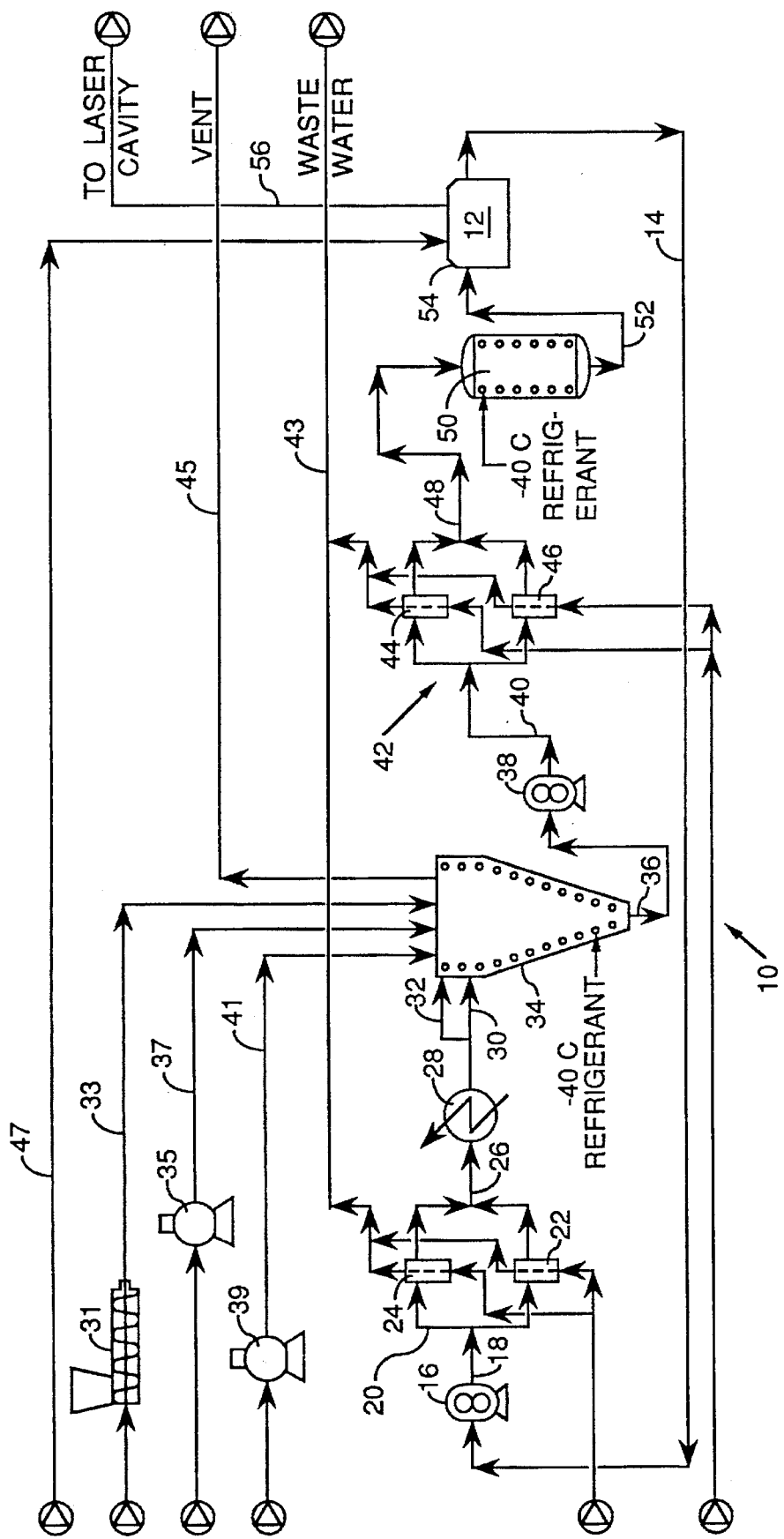
FIG. 1 is a schematic elevation view of a continuous BHP regeneration process embodying the present invention.

Referring now to the drawings, the method of the invention employs three unit operations shown in the flow diagram of FIG. 1; filtration, cooling and chemical reaction, e.g. per reaction (2) above, followed by further filtration and cooling in a collection tank as discussed below.

Thus, in operation., the spent BHP leaves the singlet oxygen generator (SOG) 12, flows in pipeline 14 and, enters the gear pump 16 to reach an output pressure capable of overcoming the pressure drop through either filter 22 or 24 in first filter assembly 20. When the pressure drop across filter 22 reaches a preset maximum, BHP flow is diverted (by, eg. a diverter valve not shown) to filter 24 and filter 22 is backflushed with water. When the pressure drop across filter 24 reaches a preset maximum, BHP flow is diverted back to filter 22 and filter 24 is backflushed with water. The BHP solution then, via pipe 26, enters a heat exchanger 28 where the heat of reaction from the SOG is removed.

Figure 2:
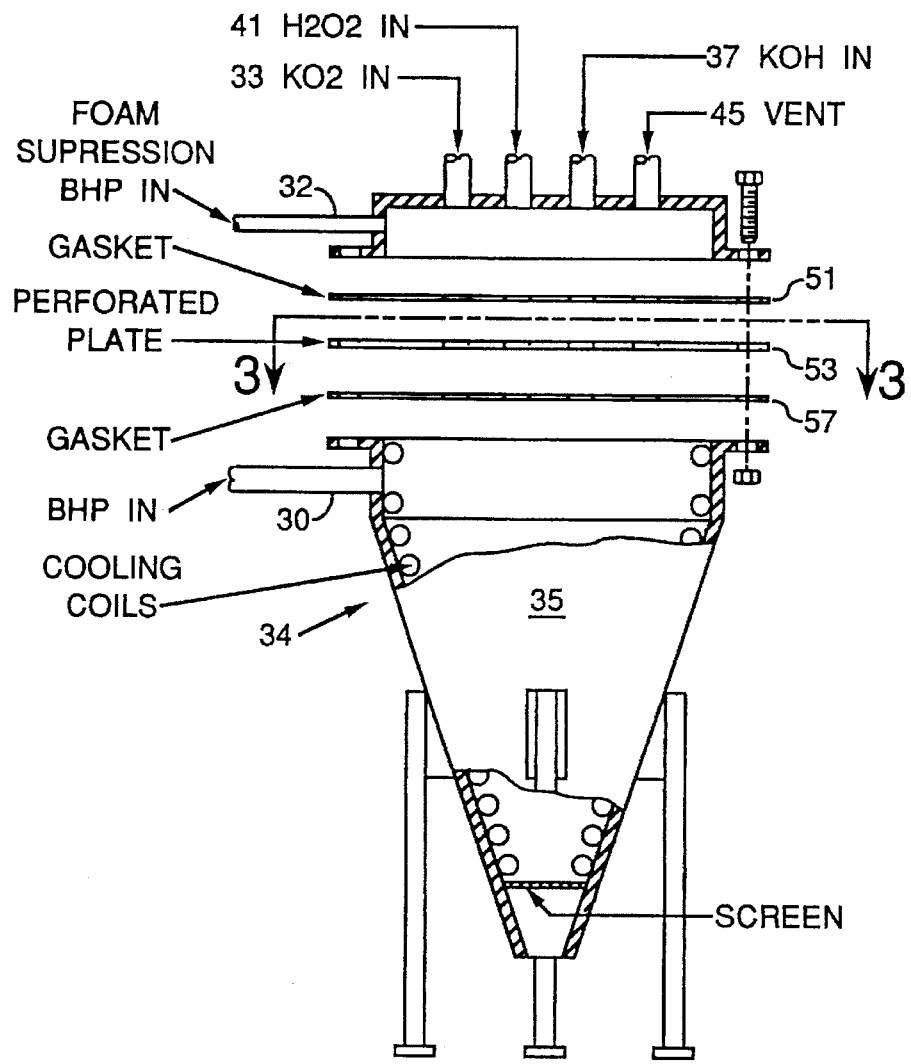
FIG. 2 is an sectional elevation schematic view of a reactor component of the reaction system of the invention of FIG. 1
Figure 3:
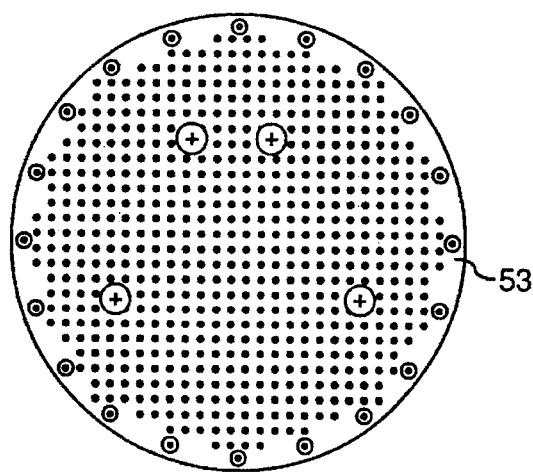
FIG. 3 is a plan view of a component of the reactor component of FIG. 2, taken on lines 3—3, looking in the direction of the arrows.

As shown in FIG. 1 and 2 the BHP solution then enters the reactor 34 via pipe 30, where it swirls, mixes and reacts with the solid $KO_2$ chunks that are fed into the reactor using a solids conveyor 31 and pipe 33. A portion of the BHP fed to the reactor is diverted via pipe 32, to the top section of the reactor where it flows through a perforated plate 53, shown in FIGS. 2 and 3, to spray BHP into the main reaction chamber in order to suppress the foaming that occurs. The oxygen liberated from this reaction is vented through a pipe 45 in the top of the reactor 34. There are also metering pumps 35 and 39, which feed make-up KOH and $H_2O_2$ to the reactor 34, via. pipes 37 and 41 respectively, as shown or indicated in FIGS. 1 and 2. The resulting BHP solution is then passed via pipe 36 through a gear pump 38, to increase its pressure.

Since more KCl will precipitate out of solution due to cooling in the heat exchanger 28 and increasing hydroperoxide concentration in reactor 34, the BHP is again filtered using a second filter assembly 42, through either filter 44 or 46, which are alternated in the same manner as filters 22 and 24 above. The BHP is then sent via pipe 48, to the mix tank, 50, where the heat of reaction from the regeneration reaction is removed and the BHP solution is returned to its normal operating temperature.

This process can also be operated in stand-by mode. The BHP solution can collect and cool in the mix tank 50, and be stored for several days until required by the SOG for operation of the COIL system.

Then the BHP solution can be sent via pipe 52 to the SOG 54 and reacted with $Cl_2$, added by pipe 47, to make singlet delta oxygen per reaction (2) above. The singlet delta oxygen is drawn of to a laser cavity (not shown) via pipe 56 as indicated in FIG. 1.

As indicated above, $KO_2$ and $H_2O_2$ are fed to the reactor 34 to react with the depleted BHP solution to replenish same, e.g. per reaction (3).above. Alternativly KOH and $H_2O_2$ can be added to the reactor 34, to react with the depleted BHP to replenish same, i.e. regenerate more BHP, e.g. per reaction (1) above.

As indicated above, the plant-scale process of the invention, by alternating filter cartridges at the first filter assembly 20 and second filter assembly 42, continuously regenerates the BHP solution for continuous fueling of a COIL. Such plant process filters by-product solids from the depleted BHP solution and then cools such solution in a heat exchanger 28. Such BHP solution is then reacted in reactor 34, e.g. per reaction (1) or (3) to replenish the BHP solution, by chemical regeneration of the hydroperoxide ion ($O_2H^-$) as described above.

In an example of start-up of the system of FIG. 1, KOH and aqueous $H_2O_2$ is added to the reactor 34 to provide BHP solution, e.g. per reaction (1) above. The BHP solution then passes through the filter assembly 42, the cooled storage tank 50 and the SOG reactor 54 as above described. $Cl_2$ is introduced by pipe 47, singlet delta oxygen is given off by vent 56 and depleted BHP is discharged by pipeline 14 through pump 16, first filter assembly 20, heat exchanger 28 and back to the reactor 34. At this point $KO_2$ replaces KOH and is fed to the reactor 34 along with aqueous $H_2O_2$, to replenish the depleted BHP as described above. Alternatively, KOH can be employed as before instead of $KO_2$ or both can be employed together to replenish or regenerate BHP from the depleted BHP as desired, in the continuous method of BHP regeneration embodying the invention.

The method of the invention can be employed to maintain the concentration of hydroperoxide ions in the BHP solution for extended periods of time, since this reactive species is regenerated continuously. Extended run times are required for welding and/or cutting operations where precise and constant laser beam energy is required. This process will minimize the amount of BHP required to run a COIL since the BHP is regenerated and recycled repeatedly rather than flowed only once through the generator and discarded, as is current practice. This will minimize the size and cost of BHP run/mix storage tanks required to support extended lasing times.

A primary advantage of the method of the invention is its direct application to a COIL system to allow continuous operation of such laser (i.e. for several hours or more). The method of the invention diverts the BHP solution flow to alternate cartridge-type filters mounted in the system as shown, to allow for continuous filtration of the BHP solution (i.e. no down-time is required for filter changes during laser operation). Also the heat exchangers in the system of FIG. 1, continuously meet cooling requirements of the BHP solution being replenished, which again avoids or minimizes down-time during laser operation.

The above plant process of the invention can be used whenever continuous production of replenished BHP solution or if singlet delta oxygen is desired, such as for use in COIL lasers, as discussed above or in biological research or other suitable uses per the scope of the present invention.

What is claimed is:

1. A method for the continuous regeneration of basic hydrogen peroxide (BHP) from depleted BHP solution comprising:

a) passing said depleted BHP solution through a first filter assembly to remove solids therefrom, b) passing the so-filtered BHP solution through a heat exchanger to cool said solution, c) mixing and reacting said solution with $H_2O_2$ and a reactant selected from the group consisting of $KO_2$ and KOH, to regenerate BHP in said solution, d) passing the replenished BHP solution through a second filter assembly to remove further solids, each of said filter assemblies having a pair of filters such that the flowing BHP solution is periodically diverted from one to another of said pair of filters so that the nonused filter can be cleaned while said solution passes through the other filter, for continuous filtration of said solution during alternate cleaning of said filters and e) passing the so-filtered BHP solution to a collection tank to cool and store same.

2. The method of claim 1 wherein said continuous method is stopped when said collection tank is filled.

3. The method of claim 1 wherein make-up $_2O_2$ in the amount of 30 to 70 wt. % is added to recycled BHP solution along with a reactant selected from the group consisting of $KO_2$ and KOH.

4. The method of claim 1 wherein the stored and cooled BHP solution is continuously fed to a singlet oxygen generator (SOG) and $Cl_2$ is fed to said SOG to react with said BHP solution and form singlet delta oxygen.

5. The method of claim 4 wherein said singlet delta oxygen is continuously fed to a COIL laser from said SOG.

6. The method of claim 5 wherein said depleted BHP solution is formed in said SOG and recycled for filtration and regeneration thereof.

* * * * *